United States Patent Office 3,193,666
Patented July 6, 1965

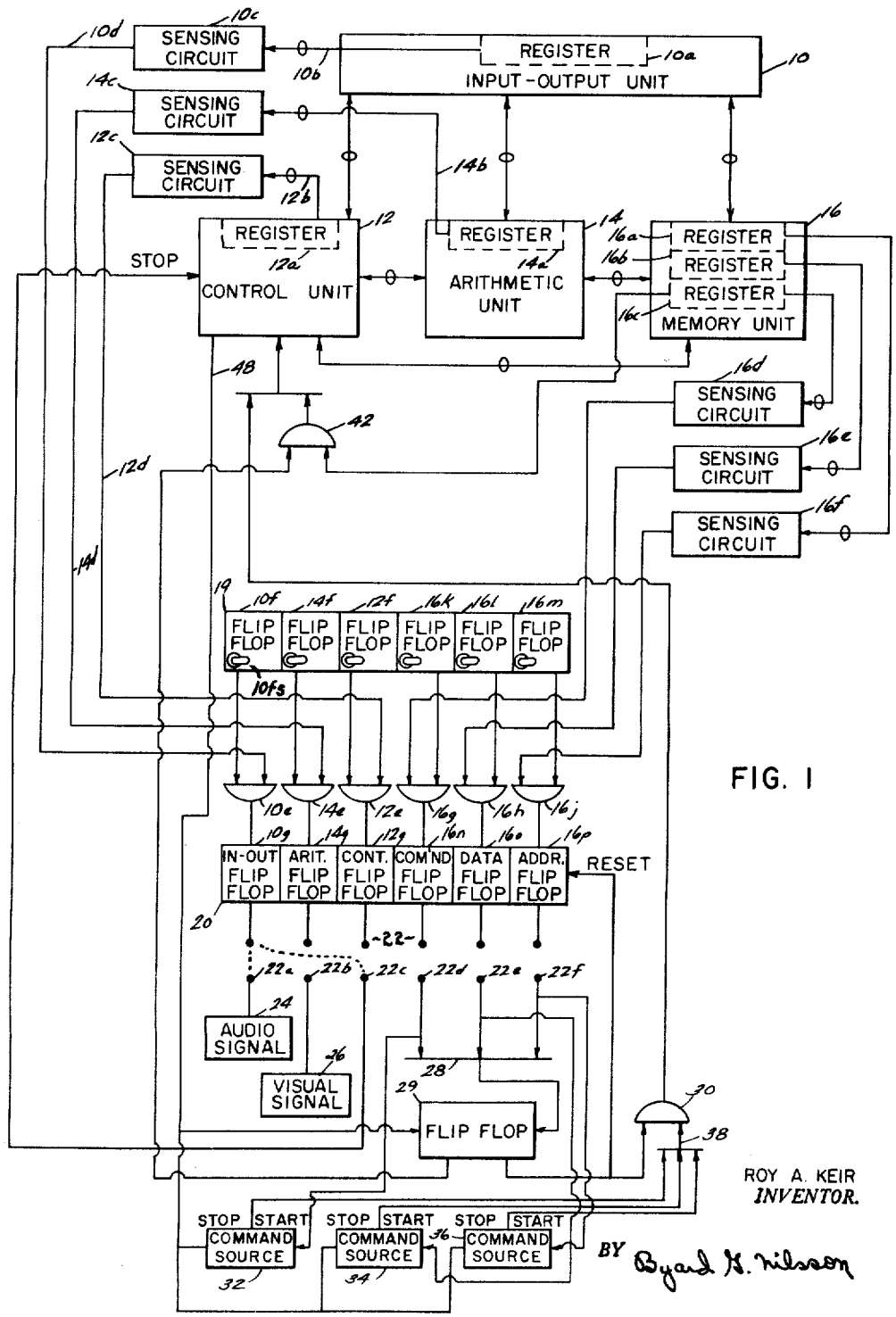

3,193,666
COMPUTER CONTROL SYSTEMS
Roy A. Keir, Los Angeles, Calif., assignor, by mesne assignments, to Control Data Corporation, Minneapolis, Minn., a corporation of Minnesota
Filed June 9, 1961, Ser. No. 116,131
2 Claims. (Cl. 235—153)

The present invention relates to a control system for electronic computers, and particularly to such a system which acts in the event of a malfunction within the computer.

In the normal operation of conventional electronic computers, signal-represented data is manipulated and combined in accordance with signal-represented commands. In the manipulation of the signals representing the data and the commands, errors sometimes occur which result in error signals representing non-existent data or commands. It has been previously proposed, to variously sense the signals in an electronic computer to detect the occurrence of such error signals. Upon detecting the presence of error signals, the system may stop the computer from performing further operations and beckon the operator to investigate and correct the situation prior to further operations by the computer.

In the operation of computers employing prior control systems for interrupting computation, certain limitations have existed. For example, in some instances it may be desirable to operate a computer so that certain normally-meaningless signals are permitted to exist. However, if the computer automatically halts upon the occurrence of these signals, they cannot be developed deliberately, if computation is to continue. In some instances, it is also desirable to formulate a computer program-of-operation in which the appearance of an unconventional signal commands an alteration in the program of operation. Of course, a control system which would provide such a facility would result in considerable program flexibility.

In the operation of a computer under the control of command signals, the command signals are normally maintained separate from the data signals representing values which are to undergo computation. However, it is sometimes desirable to vary the mode of operation upon encountering certain data signals in the course of process. That is, this mode of operation would provide control means to sense certain data signals whereby to alter the program of the computer.

In general, the present invention comprises a control system for an electronic computer which includes a memory unit for storing data and commands so that the data is processed, as by an arithmetic unit under control of the commands by means of a control unit which corporates the control system of the present invention. More specifically, the control system includes means to sense the occurrence of any plurality of any unconventional signals appearing at active locations in the computer, and means to register the occurrence of such signals. A series of switches are then provided to control the effect of the occurrence of such signals upon the control means to variously alter the operation of the computer.

An object of the present invention is to provide an improved computer control system.

Another object of the present invention is to provide a control system for an electronic computer which obtains considerable flexibility in the operation of the computer.

Another object of the present invention is to provide an economical and relatively simple system to supplment the major control system of a computer, whereby to control the operation of the computer in accordance with signals representing data and commands.

These and other objects of the present invention will become apparent from a consideration of the following, taken in conjunction with the drawings, wherein;

FIGURE 1 is a diagrammatic representation of a system constructed in accordance with the present invention.

Generally, the system of the present invention is integrated with the conventional components of an electronic computer, i.e. an input-output unit 10, a control unit 12, an arithmetic unit 14 and a memory unit 16. These units are inter-connected by electrical cables to enable the transfer of data and commands between the units, and to process data under the control of commands. Various forms of these units and manners of interconnecting them are well known in the prior art; however, one exemplary composite system is shown and described in United States Patent 2,982,472 issued May 2, 1961 to H. D. Huskey.

These units each include at least one register, which contains signals representative of data currently commanding or undergoing an operation. That is, various registers in these units may be considered as active register locations as the data they contain is pertinent to the current operation in the system. Specifically, for example, the input-output unit contains a register 10a which registers signals undergoing communication into or out of the computer. Furthermore, the control unit 12 contains a register 12a which holds the command word, i.e. the command signals directing the current operation of the computer. The arithmetic unit contains a register 14a in which arithmetic products are developed, and which may be referred to in the art as the accumulator. Of course, the memory unit 16 contains many registers; however, pertinent to the present invention are the address register 16a, the buffer register 16b and the command register 16c. The address register 16a contains the signals indicative of the location in the memory unit 16 currently identified to provide or receive signals. The buffer register 16d provides the transfer path of signals in and out of the memory unit 16, and the command-source register 16c is the last register in a chain of registers from which commands are provided.

In the operation of the computer embodying the units considered above, the input-output unit 10 is employed to fill the memory unit 16 with signal-represented data and command words. A starting signal is then provided to the control unit 12, as by manned means, as a switch internal of the unit 12, causing the control unit to accept a command from the memory unit 16 (specifically the command-source register 16c) which command directs the movement of a data word from one location in the memory unit to another, or from the memory unit to the arithmetic unit or the input-output unit. In this manner, various command words are drawn from the memory unit to the control unit, from which location operations upon data words are specified and controlled.

In the operation of the basic computer as described above, malfunctions sometimes occur which result in the development of signals (representing either data or commands) which are in error and are manifest to be in error by their form. For example, a number may be developed in the arithmetic unit and contained in the register 14a which is of greater magnitude than may be contained in the registers of the memory unit 16.

Of course, such a number may result either intentionally or from an error in the machine or an error in the program. Another example of an unconventional signal-represented word would be the occurrence of an improper command word in the command register 12a, e.g. a negative command. Still other examples are address words in the address register 16a which specify non-existent addresses and data words in the buffer register 16b which do not represent numerical values.

In adidtion to the recognition of data and command words which are unconventional and therefore may indicate an error. It is often desirable to tag various command words and data words with a particular digit or group of digits to indicate a change in the program, upon appearance of such words in an active location of the system. For example, it may be desirable to provide a data word in the input-output unit via register 10a which alters the program of operation of the machine. Similarly, such a word may appear in the command-source register 16c, or the control unit command register 12a. In general, the present system functions to detect the occurrence of an unconventional word (either resulting from an error or intentionally flagged for identification) to alter the mode of operation of the machine in accordance with a predetermined program. The detailed structure of accomplishing this function will now be considered.

The input-output register 10a, may take the form of an interconnected series of flip-flop circuits to provide a binary digital register. Various registers of this type are well known in the prior art and one example is shown and described in United States Patent 2,735,005.

In the system of FIGURE 1, the active location registers are individually connected to sensing circuits which detect the occurrence of an unconventional signal-represented word in the registers. Specifically, the individual stages of the register 10a are connected through a cable 10b to a sensing circuit 10c. Then sensing circuit 10c may comprise various logic circuits as diode "and" and "or" gates, to sense the occurrence of an unconventional code word in the register 10a. Of course, the particular logic of the sensing circuit 10c depends upon the format adopted for use in the present invention; however, one simple format might comprise simply a single one bit in the most significant stage of the register 10a, which would normally register a zero unless a flag is to be provided or an error has occurred. In this instance, the sensing circuit 10c may take a very simple form as a pulse shaper sufficient to apply the one digit signal from the most-significant stage in the register 10c as an interrupt signal to an output conductor 10d. Such a circuit could take the form of a flip-flop as shown in U.S. Patent 2,769,971 issued November 6, 1956 to G. J. Bashe. In other more complex arrangements, the sensing circuit may be constructed to sense the occurrence of any of a full range of unconventional words. Of course, in such an instance, the circuit would simply be a set of logic gates to pass an interrupt signal to the conductor 10d upon the occurrence of any word labeled as unconventional in the register 10a. That is, the word to be detected is stated as a logic proposition or value, then the structure to accommodate that proposition is provided in accordance with the fomulations described in the section beginning on page 31 of the book "Arithmetic Operations in Digital Computers" by R. K. Richards, published 1955 by D. Van Nostrand Co.

The output conductor 10d is connected as an input to an "and" gate 10e which may take any of a variety of form for this logic element including that disclosed in U.S. Patent 2,769,971. Functionally, the "and" gate 10e provides an output signal at a time when all the two-stage input signals are high.

The gate 10e also receives a signal from a flip-flop 10f which is a bistable register apparatus and may take the form disclosed in the above-referenced Patent 2,769,- 971. In the event that the flip-flop 10f in the block 19 of such circuits is in a set state, it provides a high output signal to the "and" gate 10e thereby qualifying the gate to pass signals from the sensing circuit to a flip-flop 10g in a group 20 of such register circuits. Therefore, the state of the flip-flop 10f serves to condition the setting of the flip-flop 10g which operation may result in a change for the program of operation for the computer.

In a manner similar to that considered above, and by the utilization of similar elements the other registers in the computing system are connected to other control flip-flops in the group 20. Specifically, the arithmetic register 14a is connected through a cable 14b to a sensing circuit 14c which is in turn connected through a conductor 14d to a gate circuit 14e. The gate circuit 14e receives an input signal from a flip-flop 14f and provides an output to a flip-flop 14g.

The command register 12a is connected through a cable 12d to a sensing circuit 12c which is in turn connected through a conductor 12d to a gate 12e. The gate 12e has an input from a flip-flop 12f, and provides an output to a flip-flop 12g. Similar connections are made from the registers in the memory unit 16. That is, the register 16a, 16b and 16c are connected through sensing circuits 16d, 16e, and 16f respectively to gate circuits 16g, 16h, and 16j respectively. These gate circuits are connected respectively between the flip-flop circuits 16k, 16l, 16m, and the flip-flop circuits 16n, 16o, and 16p in the group 20.

The output terminals from the flip-flop circuits in the group 20 are connected to substantially half the terminals in a multi-contact switch 22. The remaining terminals in a switch 22 are variously connected to devices for altering the program of the computer or manifesting an error to the operator of the computer. For example, one of the terminals 22a is connected to an audio-signal device 24. Another of the terminals 22b is connected to a visual signal device 26. The terminal 22c in the switch is connected to the stop control of the control unit 12 in the computer. The terminals 22d, 22e and 22f are connected through an "or" gate 28 to a flip-flop 29. The "or" gate may take the form described of this structure in the above referenced Patent 2,769,971. The terminals 22d, 22e, and 22f are also individually connected to signal sources 32, 34, and 36 which are each provided to store a series of command words and provide these command words in sequence upon energization. The operation of these sources is initiated by the signals from the terminals 22d, 22e, and 22f and is halted by a signal from the control unit 12. Command words from the signal sources 32, 34 and 36 pass through an "or" gate 38 and an "and" gate 30 to be applied to the control unit 12.

In view of the above preliminary discussion, the structure and operation of the system of FIGURE 1 may now best be considered by assuming certain states for the system and explaining the functions of the elements as the operation of the system proceeds. Therefore, assume initially that it is desired to provide an audio signal if the product of computation developed in the register 14a of the arithmetic unit 14 exceeds the digit capacity of the registers in the memory 16. Furthermore, assume that upon this occurrence it is desired to halt further computation by the system. To accomplish this mode of operation the output terminal from the flip-flop 10g is connected to the terminal 22a and 22c. Next, the flip-flop 10f is exclusively placed in a set state as by a manual switch 10fs thereby qualifying the gate circuit 10e. Now, upon the occurrence of an unconventional word in the register 14a, e.g. a word having more significant digits than the registers in the memory unit 16, the sensing circuit 14c provides a high signal through conductor 14d to the gate circuit 14e. As the gate circuit 14e is qualified, the signal passes to set the flip-flop 14g. Upon this occurrence, the signal from the flip-flop 14g triggers the audio signal device 24 and provides a signal through the terminal 22c to halt further operation of the computer by pulsing the control unit 12.

Of course, various other programs may be initiated upon the occurrence of an unconventional signal-represented word. For example, it may be desirable to continue computation, however, to alter the program. Assume for example, that it is desired to sense the occurrence of an unconventional code word in the register 16a which manifests a non-existent address, to initiate a program resulting in the input-output 10 providing explicit information to the machine operator that the program has failed. In such an instance, the output from the flip-flop 16p is connected to terminal 22d. Next, the command signal source 32 is programmed by registering a sequence of commands which will cause the control unit 12a to drive the input-output unit 10 so as to provide the desired manifestation of program failure. Further to this programming operation, the flip-flop 16m is placed in a set state.

Now, upon the occurrence of an unconventional code word in the register 16a (designating a non-existent address for the memory unit 16) the sensing circuit 16f provides a signal to the "and" gate 16j, now qualified by the flip-flop 16m, to pass a signal which sets the flip-flop 16p. Thereupon, the flip-flop circuit 16p provides a signal through the "or" gate 28 to the flip-flop 29 which undergoes a change-in-state providing a low signal to an "and" gate 42 through which commands to the command register 16c pass to the control unit 12a. As a result, the "and" gate 42 is disqualified and no further command words may pass through the gate. The change in state by the flip-flop 29 also results in the development of a high signal which is applied to the gate circuit 30 connected to receive the commands from the signal sources 32, 34 and 36.

The high signal from the terminal 22d is applied to the command signal source 32 so as to initiate the operation of this signal source to provide command words through the "or" gate 38 and the "and" gate 30 to the control unit 12. These commands occur in timed sequence, and are registered in the command register 12a of the control unit to thereby control the operation of the system whereby information words stating a misfunction in the arithmetic unit are drawn from the memory unit 16 and manifest by the input-output unit 10. At the conclusion of this operation, the control unit 12 may or may not reset the flip-flop 29 through the conductor 48 to resume the program.

Considering another exemplary operation of the system, it may be desirable to provide a flagged command word, which when drawn into control unit 12 causes a change in the program of operation. This mode of operation may be effected by the sensing circuit 12c detecting the presence of the flagged word in the register 12a whereby to set the flip-flop 12g through the gate 12e and thereby provide a signal to the flip-flop 29 and a start signal to one of the command sources 32, 34 or 36. At the conclusion of the operation specified by the command sources 32, 34 or 36, the control unit 12 may or may not issue a signal through conductor 48 to stop the operation of all the command sources and reset the flip-flop 29. As a result of this operation, the system can return to control of the command sequence passing through the command source register 16c in the memory unit 16.

It is to be noted, that considerable flexibility results in the present system as a result of selective use of the block 19 of flip-flop circuits. That is, in certain programs of operation it may be desirable to override the occurrence of an unconventional signal in an active location. Specifically, for example it may be desirable to continue computation with no change in program upon the occurrence of a data word in the register 14a which exceeds the capacity of the registers in the memory unit 16. In this instance, the flip-flop 12f is manually placed in a reset state. As a result, the gate circuit 14b is disqualified and signals are not permitted to reach the flip-flop 14g. Therefore, the occurrence of the unconventional signal in the register 14a has absolutely no effect to alter the course of the program.

Of course, a wide variety of different combinations are possible by variously setting the flip-flop circuits in the block 19 and variously connecting the terminals in the multi-contact switch 22. Further flexibility is obtained by the various chains of commands which may be registered in the signal sources 32, 34 and 36. These possibilities are evident from the above examples.

One of the important features of the present invention which obtains the extended flexibility results in the use of the block 19 of flip-flops which essentially takes the form of settable switches, to qualify the effect of an unconventional signal in an active location of the computer.

Another important feature of the present invention resides in the use of the multi-contact switch 22 which may be variously connected to obtain different variations in the program depending upon the particular course of computation.

It should be noted that although the particular embodiment of the invention herein described is fully capable of providing the features and achieving the objects set forth, such embodiment is merely illustrative and this invention is not to be limited to the details of construction illustrated and described herein, except as defined by the appended claims.

What is claimed is:

1. In a computer wherein signal-represented data words are stored in a memory unit via an input-output unit, to be thereafter processed by an arithmetic unit under control of signal-represented command words supplied by a control unit, as from said memory unit, each of said units being interconnected whereby data words can be transferred from any unit to another in accordance with a program of operation, and each of said units including active register locations for words in current process, the improvement which comprises:

plural sense means to sense the occurrence of any of a plurality of predetermined signal-represented words in each of said active register locations of said computer to form an interrupt signal;

a plurality of command source means for supplying alternate signal-represented command words in plural prearranged patterns;

signal-controlled means for providing signal-represented command words to said control unit from said command source means; and means settable to alternatively permit and prevent the passage of said interrupt signals from each of said sense means to said signal controlled means thereby to alter the program of operation of said computer accordingly upon the occurrence of a predetermined signal-represented word in one of said active register locations.

2. In a computer wherein signal-represented data words are stored in a memory unit via an input-output unit, to be thereafter processed by an arithmetic unit under control of signal-represented command words supplied by a control unit, as from said memory unit, each of said units being interconnected whereby data words can be transferred from any unit to another in accordance with a program of operation, and each of said units including active register locations for words in current process, the improvement which comprises:

plural sense means to sense the occurrence of any of a plurality of predetermined signal-represented words in each of said active register locations of said computer to form an interrupt signal;

a plurality of command source means for supplying alternate signal-represented command words in plural prearranged patterns;

first signal-controlled means for providing signal-represented command words to said control unit from said command source means;

second signal controlled means for stopping said computer and manifesting an error signal; and means settable to alternatively permit and prevent the passage of any of said interrupt signals from any of said sense means to each of said signal controlled means to alter the program of operation of said computer accordingly upon the occurrence of a predetermined signal-represented word in one of said active register locations.

References Cited by the Examiner

UNITED STATES PATENTS 2,959,351  11/60  Hamilton et al. _____ 235—153
3,017,092  1/62   Rent et al. _____ 235—153

MALCOLM A. MORRISON, *Primary Examiner.*

WALTER W. BURNS, Jr., *Examiner.*